US009453303B2

United States Patent
Aberg et al.

(10) Patent No.: US 9,453,303 B2
(45) Date of Patent: *Sep. 27, 2016

(54) PERMEABLE BELT FOR THE MANUFACTURE OF TISSUE, TOWEL AND NONWOVENS

(75) Inventors: Bo-Christer Aberg, Halmstad (SE); Cary P. Johnson, Clifton Park, NY (US); Francis L. Davenport, Ballston Lake, NY (US); Pierre Riviere, Bas-rhin (FR); John J. Lafond, Appleton, WI (US); Jonas Karlsson, Falkenberg (SE); Jean-Louis Monnerie, Saint-Junien (FR)

(73) Assignee: Albany International Corp., Rochester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/063,706

(22) PCT Filed: Sep. 17, 2008

(86) PCT No.: PCT/US2008/076647
§ 371 (c)(1),
(2), (4) Date: Oct. 20, 2011

(87) PCT Pub. No.: WO2010/030298
PCT Pub. Date: Mar. 18, 2010

(65) Prior Publication Data
US 2012/0027997 A1   Feb. 2, 2012

Related U.S. Application Data

(60) Provisional application No. 61/096,149, filed on Sep. 11, 2008.

(51) Int. Cl.
| | | |
|---|---|---|
| *B32B 3/24* | (2006.01) | |
| *D21F 11/00* | (2006.01) | |
| *D04H 1/44* | (2006.01) | |
| *D04H 1/46* | (2012.01) | |
| *D21F 1/00* | (2006.01) | |
| *B32B 3/26* | (2006.01) | |

(52) U.S. Cl.
CPC ............. *D21F 11/006* (2013.01); *D04H 1/44* (2013.01); *D04H 1/46* (2013.01); *D21F 1/0027* (2013.01); *D21F 1/0036* (2013.01); *B32B 3/266* (2013.01); *Y10T 428/24273* (2015.01); *Y10T 428/24496* (2015.01); *Y10T 428/24504* (2015.01)

(58) Field of Classification Search
CPC ...................................................... B32B 3/266
USPC ......................................... 428/137, 138, 131
See application file for complete search history.

(56) References Cited

U.S. PATENT DOCUMENTS

| | | |
|---|---|---|
| 2,862,251 A | 12/1958 | Kalwaites |
| 3,121,660 A | 2/1964 | Hall, Jr. |

(Continued)

FOREIGN PATENT DOCUMENTS

| | | |
|---|---|---|
| DE | 25 38 691 | 3/1977 |
| DE | 3444082 A | 8/1986 |

(Continued)

OTHER PUBLICATIONS

International Search Report and Written Opinion for PCT/US2010/022247.

(Continued)

*Primary Examiner* — William P Watkins, III
(74) *Attorney, Agent, or Firm* — McCarter & English, LLP; Kathleen N. Ehrhard

(57) ABSTRACT

A fabric structure used to make textured tissue or towel or nonwovens, the structure being permeable to air and water, comprising a sheet contact surface having a pattern including a series of raised land areas and corresponding depressions adapted to impart a texture to the tissue or towel or nonwoven, and a series of through voids adapted to allow passage of both water and/or air from the fabric surface into and/or through the structure.

65 Claims, 12 Drawing Sheets

(56) References Cited

U.S. PATENT DOCUMENTS

| | | |
|---|---|---|
| 3,214,819 A | 11/1965 | Guerin |
| 3,323,226 A | 6/1967 | Beaumont et al. |
| 3,399,111 A | 8/1968 | Beaumont et al. |
| 3,485,706 A | 12/1969 | Evans |
| 3,508,308 A | 4/1970 | Bunting, Jr. et al. |
| 4,085,485 A | 4/1978 | Brandon et al. |
| 4,206,258 A | 6/1980 | Balcar |
| 4,446,187 A | 5/1984 | Eklund |
| 4,537,658 A | 8/1985 | Albert |
| 4,541,895 A | 9/1985 | Albert |
| 4,849,054 A | 7/1989 | Klowak |
| 5,098,764 A | 3/1992 | Drelich et al. |
| 5,208,087 A | 5/1993 | Stigberg |
| 5,244,711 A | 9/1993 | Drelich et al. |
| 5,245,025 A | 9/1993 | Trokhan et al. |
| 5,281,461 A | 1/1994 | Greenway et al. |
| 5,298,124 A | 3/1994 | Eklund et al. |
| 5,336,373 A | 8/1994 | Scattolino et al. |
| 5,393,384 A | 2/1995 | Steiner et al. |
| 5,445,746 A | 8/1995 | Lee |
| 5,549,193 A | 8/1996 | Schlueter, Jr. et al. |
| 5,674,587 A | 10/1997 | James et al. |
| 5,679,222 A | 10/1997 | Rasch et al. |
| 2,730,246 A | 2/1998 | Vuillaume |
| 5,713,399 A | 2/1998 | Collette et al. |
| 5,730,817 A | 3/1998 | Feygin et al. |
| 2,734,285 A | 6/1998 | Noelle |
| 5,776,307 A * | 7/1998 | Ampulski et al. ............ 162/117 |
| 5,814,349 A | 9/1998 | Geus et al. |
| 5,827,597 A | 10/1998 | James et al. |
| 5,837,102 A | 11/1998 | Graf |
| 5,900,122 A | 5/1999 | Huston |
| 5,906,786 A | 5/1999 | James et al. |
| 5,916,462 A | 6/1999 | James et al. |
| 5,972,813 A | 10/1999 | Polat et al. |
| 6,010,598 A | 1/2000 | Boutilier et al. |
| 6,120,642 A | 9/2000 | Lindsay et al. |
| 6,124,015 A | 9/2000 | Baker et al. |
| 6,159,880 A | 12/2000 | Schiel |
| 6,171,447 B1 | 1/2001 | Trokhan |
| 6,274,042 B1 | 8/2001 | Beck |
| 6,290,818 B1 | 9/2001 | Romanski |
| 6,331,341 B1 | 12/2001 | Joyce |
| 6,340,413 B1 | 1/2002 | Nilsson et al. |
| 6,358,594 B1 | 3/2002 | Ampulski |
| 6,436,240 B1 | 8/2002 | Jeffrey |
| 6,461,474 B1 | 10/2002 | Lindsay et al. |
| 6,547,924 B2 | 4/2003 | Klerelid et al. |
| 6,610,173 B1 | 8/2003 | Lindsay et al. |
| 6,616,812 B2 | 9/2003 | Beck |
| 6,616,814 B2 | 9/2003 | Best |
| 6,630,223 B2 | 10/2003 | Hansen |
| 6,660,362 B1 | 12/2003 | Lindsay et al. |
| 6,712,940 B2 | 3/2004 | Crook |
| 6,723,208 B1 | 4/2004 | Hansen |
| 6,743,339 B1 | 6/2004 | Nilsson et al. |
| 6,743,571 B1 | 6/2004 | Hill et al. |
| 6,780,282 B2 | 8/2004 | Scherb et al. |
| 6,865,784 B2 | 3/2005 | Nolle |
| 6,875,315 B2 | 4/2005 | Bakken et al. |
| 6,878,238 B2 | 4/2005 | Bakken et al. |
| 6,998,017 B2 | 2/2006 | Lindsay et al. |
| 7,005,044 B2 | 2/2006 | Kramer et al. |
| 7,008,513 B2 | 3/2006 | Davenport et al. |
| 7,014,735 B2 | 3/2006 | Kramer et al. |
| 7,022,208 B2 | 4/2006 | Davenport et al. |
| 7,128,809 B2 | 10/2006 | Viinson et al. |
| 7,128,810 B2 | 10/2006 | Hansen |
| 7,141,142 B2 | 11/2006 | Burazin et al. |
| 7,144,479 B2 | 12/2006 | Davis et al. |
| 7,166,196 B1 | 1/2007 | Kramer et al. |
| 7,169,265 B1 | 1/2007 | Kramer et al. |
| 7,294,237 B2 | 11/2007 | Herman et al. |
| 7,294,238 B2 | 11/2007 | Bakken et al. |
| 7,297,233 B2 | 11/2007 | Herman et al. |
| 7,410,554 B2 | 8/2008 | Davenport |
| 7,491,297 B2 | 2/2009 | Serr et al. |
| 7,494,571 B2 | 2/2009 | Takamura |
| 7,501,044 B2 | 3/2009 | Hikida et al. |
| 7,504,060 B2 | 3/2009 | Brock et al. |
| 7,524,403 B2 | 4/2009 | Fernandes et al. |
| 7,527,709 B2 | 5/2009 | Lippi Alves Fernandes et al. |
| 7,540,942 B2 | 6/2009 | Hikita |
| 7,550,061 B2 | 6/2009 | Walkenhaus et al. |
| 8,454,800 B2 | 6/2013 | Mourad et al. |
| 8,758,569 B2 * | 6/2014 | Aberg ..................... D04H 1/44 162/115 |
| 2002/0179264 A1 * | 12/2002 | Phan et al. ..................... 162/109 |
| 2003/0087575 A1 | 5/2003 | Carlson et al. |
| 2003/0145444 A1 | 8/2003 | Schmitz |
| 2004/0069432 A1 | 4/2004 | Hansen |
| 2004/0116031 A1 | 6/2004 | Brennan et al. |
| 2004/0118545 A1 | 6/2004 | Bakken et al. |
| 2004/0118546 A1 | 6/2004 | Bakken et al. |
| 2005/0167062 A1 | 8/2005 | Herman et al. |
| 2007/0134467 A1 | 6/2007 | Sayers |
| 2007/0167099 A1 | 7/2007 | Patel et al. |
| 2007/0246119 A1 | 10/2007 | Herman |
| 2010/0239814 A1 | 9/2010 | Mourad et al. |

FOREIGN PATENT DOCUMENTS

| | | |
|---|---|---|
| DE | 19548747 A | 7/1997 |
| EP | 0 037 387 A | 10/1981 |
| EP | 0 103 376 A | 7/1983 |
| EP | 0 147 904 A | 7/1985 |
| EP | 0 337 451 A | 10/1989 |
| EP | 0 446 432 A | 9/1991 |
| EP | 0 705 933 A | 4/1996 |
| EP | 0 972 876 A2 | 1/2000 |
| EP | 1 040 223 B | 2/2003 |
| EP | 0 868 251 B | 11/2004 |
| EP | 1 566 259 A | 8/2005 |
| EP | 1 339 915 B | 7/2007 |
| FR | 1 460 513 A | 10/1966 |
| FR | 2730246 A | 8/1996 |
| FR | 2734285 A | 11/1996 |
| GB | 1025000 | 4/1966 |
| GB | 1037003 | 7/1966 |
| GB | 1 393 426 | 5/1975 |
| GB | 1515455 | 6/1978 |
| GB | 995620 | 6/1995 |
| JP | 61-020686 | 1/1986 |
| JP | 06-170959 | 6/1994 |
| JP | 2001-288671 A | 10/2001 |
| JP | 2004-169235 | 6/2004 |
| WO | WO 86/05219 A | 9/1986 |
| WO | WO 95/21285 A | 8/1995 |
| WO | WO 98/00605 A | 1/1998 |
| WO | WO 98/01618 A | 1/1998 |
| WO | WO 99/10597 A | 3/1999 |
| WO | WO 02/40769 A | 5/2002 |
| WO | WO 02/41815 A | 5/2002 |
| WO | WO 2004/038093 A | 5/2004 |
| WO | WO 2005/042836 A | 5/2005 |
| WO | WO 2005/087997 A | 9/2005 |
| WO | WO 2005/116332 A | 12/2005 |
| WO | WO 2008/006870 A | 1/2008 |
| WO | WO 2010/030298 A | 3/2010 |
| WO | WO 2010/030570 A | 3/2010 |

OTHER PUBLICATIONS

International Search Report and Written Opinion from EPO for PCT/US2008/076647.
International Search Report and Written Opinion from EPO for PCT/US2009/056007.
International Search Report and Written Opinion from EPO for PCT/US2009/055751.

\* cited by examiner

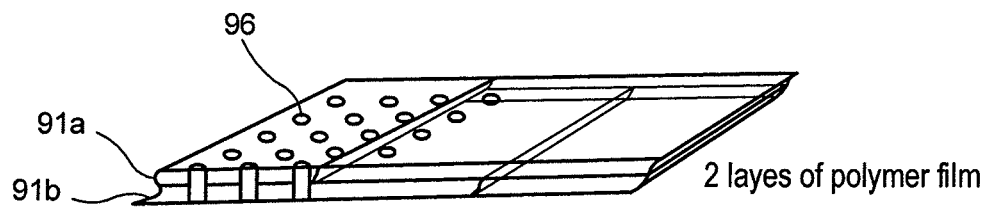
FIG. 9A
Sheet contact side | Opposite side
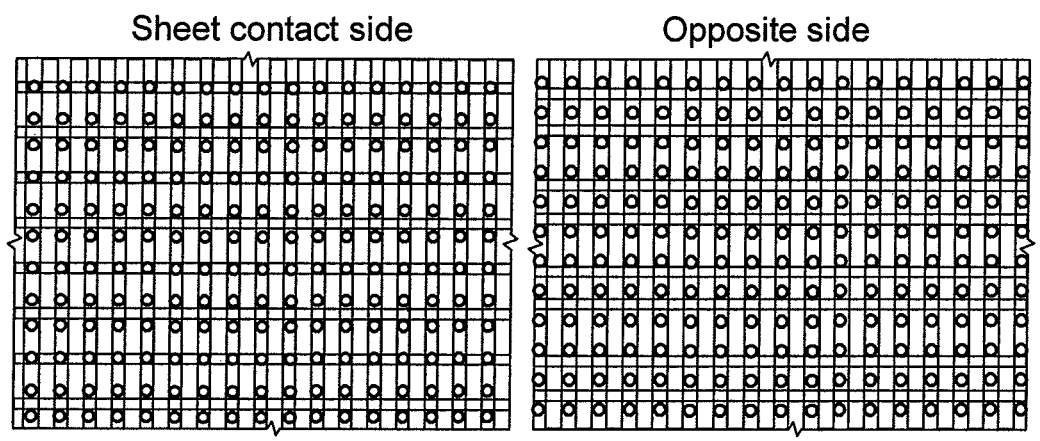
FIG. 9B | FIG. 9C
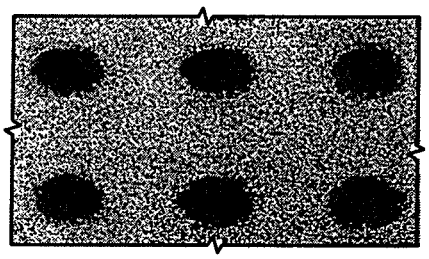 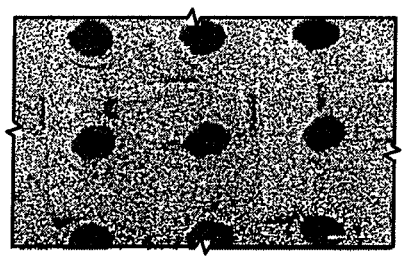
SEM picture of sheet contact side | SEM picture of oposite side
FIG. 9D | FIG. 9E

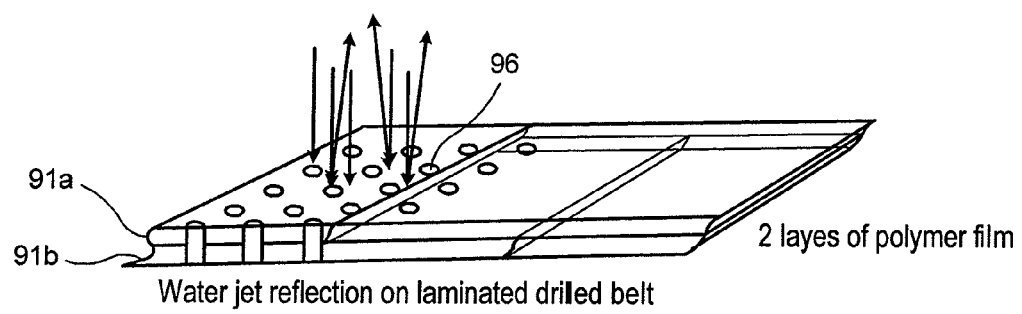
F I G. 9F
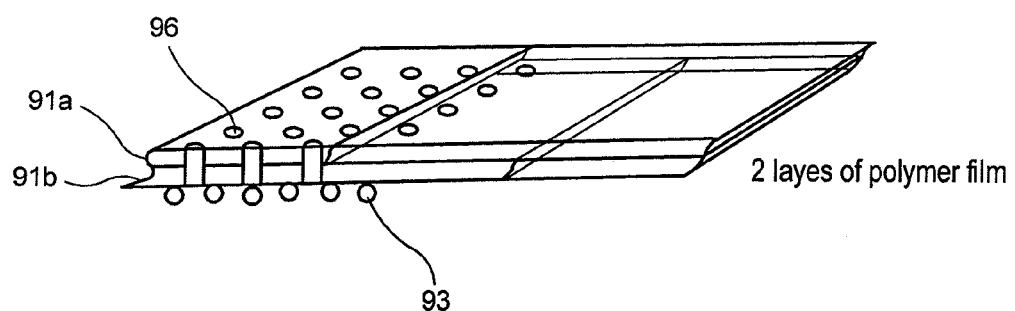
F I G. 9G

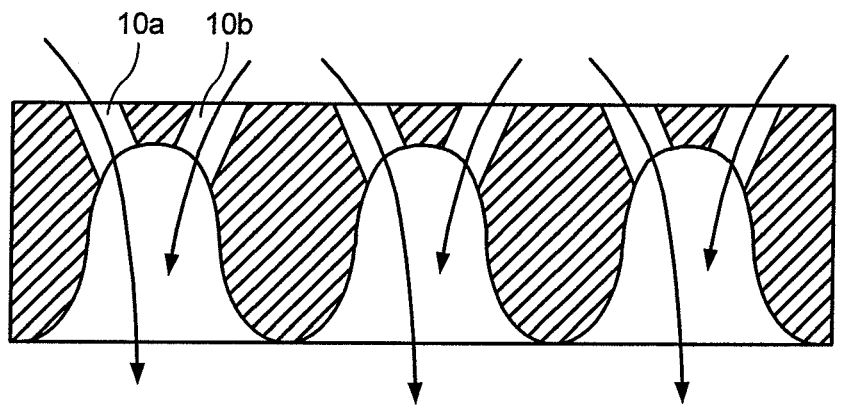
F I G. 10A
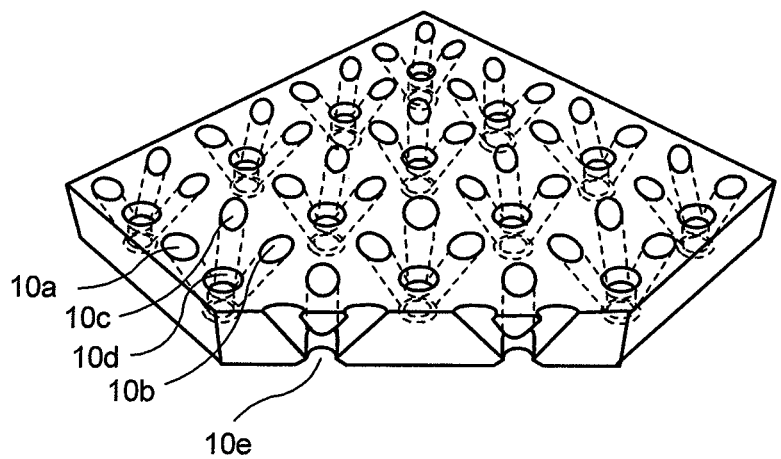
F I G. 10B
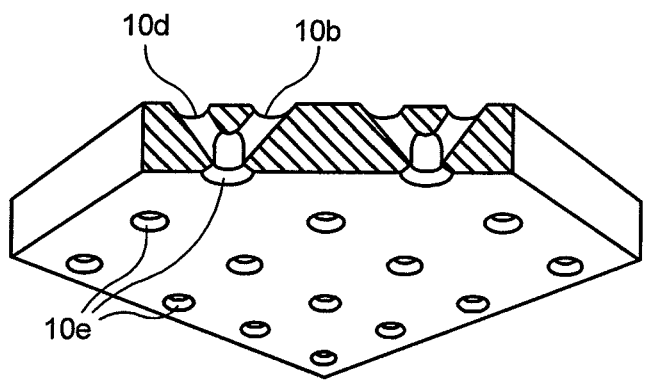
F I G. 10C

PERMEABLE BELT FOR THE MANUFACTURE OF TISSUE, TOWEL AND NONWOVENS

CROSS-REFERENCE TO RELATED APPLICATION

This application is a 371 of PCT/US2008/076647 filed on Sep. 17, 2008 published on Mar. 18, 2010 under publication number WO 2010/030298 A and claims priority benefits of U.S. Provisional Patent Application Ser. No. 61/096,149 filed Sep. 11, 2008, the disclosure of which is incorporated herein by reference.

FIELD OF THE INVENTION

The present invention relates to endless structures, in belt or sleeve form, for use in the production of tissue, towel or nonwovens, and more particularly, to produce structured or textured tissue, towel or nonwovens.

BACKGROUND OF THE INVENTION AND DISCUSSION OF RELATED ART

Papermaking belts are well-known in the art. Papermaking belts are used to dewater and transport cellulosic fibers in a papermaking machine. The cellulosic fibers become an embryonic web and, upon drying, the finished product.

Typically, papermaking belts do not impart structure to the paper made thereon. "Structure" refers to variations in the basis weight and/or the density of the paper which are greater than occur in ordinary papermaking and due to ordinary variations, such as those induced by creping. "Structure" may also refer to a texture or a pattern in the tissue or towel sheet. Such "structured" tissue/towel sheets are usually soft and bulky with high absorbency. Such papermaking belts may be Through Air Drying ("TAD") belts or conventional press fabrics, transfer fabrics, or forming fabrics. Such belts comprise a surface patterning framework and may have a reinforcing structure. Structured tissue and towel can be softer, more absorbent, and be of a lower basis weight than unstructured tissue/towel. A preferred method for producing structured tissue/towel typically is Through Air Drying, which can be costly and energy intensive.

The use of impermeable belts to provide a structure to a tissue or towel sheet is also known from the art. U.S. Pat. No. 6,743,339, the entirety of which is incorporated by reference hereby, teaches the use of a smooth impermeable belt used to make tissue. U.S. Pat. Nos. 5,972,813, 6,340,413, and 6,547,924, the entirety of each of which is incorporated by reference hereby, each teach the use of an impermeable belt to provide a texture to the tissue or towel sheet. The patents explain that the impermeable belts have a measured air flow of less than 20 cfm (cubic feet per min of air passing through a square foot of belt at a one half inch water gauge pressure.) Further, U.S. Pat. No. 5,972,813 teaches that no water passes through any "capillary" having a dimension of 50 microns or greater.

The use of permeable belts with a texture is also known. U.S. Pat. No. 5,837,102, the entirety of which is incorporated by reference hereby, teaches such a belt with through holes. However the micro texture on the belt surface is only to aid sheet release.

Many presses and devices (machine apparatus) have been developed over the years to make soft, bulky structural tissue or towel in some manner. All of these devices attempt to balance the bulk properties of the structured sheet with cost and complexity. Energy and fiber costs are the two main drivers. The use of an impermeable belt is suggested to minimize energy costs as it was thought that use of a permeable belt would not lead to maximum sheet dewatering.

German Patent No. 195 48 747, the entirety of which is incorporated by reference hereby, discloses a paper machine for making creped tissue, which has a press comprising a shoe press roll, a counter roll and a suction roll, the counter roll forming a first press nip with the suction roll and a second extended press nip with the shoe press roll. A press fabric runs through the two press nips together with the paper web and then brings along the paper web to a Yankee cylinder, to which the paper web is transferred when the press fabric and the paper web pass around a transfer roll, which forms a non-compressing nip with the Yankee cylinder. Suction zones for dewatering the press fabric are available before and after the first press nip, the suction zone before the press nip located inside the suction roll while the suction zone after the press nip is located in a side loop, in which the press fabric runs alone to meet again the paper web at the entry of the second press nip. Such a paper machine is inconvenient since the paper web is rewet by the wet press fabric before it reaches the Yankee cylinder.

U.S. Pat. No. 5,393,384 ("the '384 patent"), the entirety of which is incorporated by reference hereby, discloses a paper machine for producing a tissue web, which in the embodiment according to FIG. 6 of the '384 patent comprises a non-compressible, water-impermeable belt, the underside of which conducts a paper web through a shoe press nip and from there to a Yankee cylinder, via a transfer roll which forms a nip with the Yankee cylinder. This impermeable belt has a smooth web-carrying surface which makes an adhesive water film form thereon as the belt passes through the press nip together with a press fabric which has a non-smooth surface in contact with the paper web. A Yankee cylinder has a smooth surface. As both the Yankee cylinder and the impermeable belt have smooth surfaces which the paper web is intended to contact, there is a risk that the paper web can continue to adhere to the smooth surface of the impermeable belt after having passed the nip adjacent to the Yankee cylinder instead of being transferred, as desired, to the smooth surface of the dryer cylinder. Not even if large amounts of adhesive are applied to the circumferential surface of the dryer cylinder will it be possible to ensure that the paper web adheres to the Yankee cylinder.

The production of nonwoven products is well known in the art. Such products are produced directly from fibers without conventional textile methods such as weaving or knitting operations. Instead, they may be produced by nonwoven manufacturing methods such as airlaid, drylaid, and carding, or some combination of these processes in which fibers are laid down to form an integral nonwoven web.

Nonwoven product may also be produced by airlaying, or carding operations where the web of fibers is consolidated or processed, subsequent to deposition, into a nonwoven product by needling or spunlacing (hydroentanglement.) In the latter, high-pressure water jets are directed vertically down onto the web to entangle the fibers with each other. In needling, the entanglement is achieved mechanically through the use of a reciprocating bed of barbed needles which force fibers on the surface of the web further thereinto during the entry stroke of the needles.

There presently exists an apparatus for the production of nonwovens, for example, spunbond webs, structures or articles formed from filaments or fibers typically made from a thermoplastic rein. Such an apparatus is disclosed in U.S. Pat. No. 5,814,349, the disclosure of which is incorporated herein by reference. Such apparatuses typically include a spinneret for producing a curtain of strands and a process-air blower for blowing process air onto the curtain of strands for cooling the same to form thermoplastic filaments. The thermoplastic filaments are then typically aerodynamically entrained by the process air for aerodynamic stretching of the thermoplastic filaments, which are then after passing through a diffuser deposited upon a continuously circulating belt or screen (permeable fabric) for collecting the interentangled filaments and forming a web thereon. The web, structure or article, so formed, is then transferred and subject to further processing.

In the meltblown process for manufacturing nonwoven materials, thermoplastic polymer is placed in an extruder and is then passed through a linear die containing about twenty to forty small orifices per inch of die width. Convergent streams of hot air rapidly attenuate the extruded polymer steams to form solidifying filaments. The solidifying filaments are subsequently blown by high velocity air onto a take-up screen or another layer of woven or nonwoven material thus forming a meltblown web.

The spunbonding and meltblowing process can be combined in applications such as spunbound-meltblown-spunbound ("SMS"). In SMS a first layer of spunbonded material is formed on a belt or conveyor. The belt typically has a uniform surface pattern and air permeability to attain the right web formation during the spunbond process. The spunbonded material is deposited on the belt at the lay down forming area to form the web in a first spunbond beam.

A pressure nip, or systems such as utilizing a hot air knife can help to enhance pre-bonding pressure and/or temperature acting on the web. In order to assist in drawing the thermoplastic fibers onto the forming belt, a vacuum box is located beneath the belt and which applies suction to the belt. The airflow needed for the spunbond process is supplied to the system by a vacuum box connected to the appropriately sized vacuum pump.

An airlaid process may also be used to form a nonwoven web. The airlaid process begins with a defibrillation system to open fluff pulp. A conventional fiberizer or other shredding device may also be used to form discrete fibers. Particles of absorbent materials (for example super absorbent powder), abrasives, or other materials may then be mixed with the fibers. The mixture is then suspended in an air stream within a forming system and deposited to a moving forming belt or rotating perforated cylinder onto the circumference of which can be a metallic or polymer sleeve. The randomly oriented airformed fiber may then be bonded by applying a latex binder and drying or thermally bonding.

All these processes can use belts or sleeves which can texture or provide a texture to the nonwoven sheet produced. These belts can be permeable to air and water. Belts used, however, are produced via a woven substrate of polymeric yarns in some pattern.

Nonwoven products are generally made up of fibers locked into place by fiber interaction to provide a strong cohesive structure, with or without the need for chemical binders or filament fusing. The products may have a repeating pattern of entangled fiber regions, of higher area density (weight per unit area) than the average area density of the product, and interconnecting fibers which extend between the dense entangled regions and which are randomly entangled with each other. Localized entangled regions may be interconnected by fibers extending between adjacent entangled regions to define regions of lower area density than that of the adjacent high-density region, as the nonwoven is supported on the woven belt as it passes through the machine. A pattern of apertures substantially free from fibers may be defined within or between the dense entangled regions and interconnecting fibers. In some products the dense entangled regions are arranged in a regular pattern and joined by ordered groups of fibers to provide a nonwoven product having an appearance similar to that of a conventional woven fabric, but in which the fibers proceed randomly through the product from entangled region to entangled region. The fibers of an ordered group may be either substantially parallel or randomly disposed relative to one another. Embodiments include nonwoven products having complex fiber structures with entangled fiber regions interconnected by ordered fiber groups located in different thickness zones of the nonwoven, which are particularly suitable for apparel, including dress goods and suiting materials, and industrial products such as wipes. However, any such texture or density variations are caused by the weave pattern itself of the woven structure, subsequent processes such as embossing using mechanical rolls and pressure, or from the process itself (hydroentangling causes fiber orientation and entangling differences).

SUMMARY OF THE INVENTION

Disclosed is a fabric structure used to make textured tissue or towel or nonwovens, the structure being permeable to both air and/or water.

Further, the structure has a sheet contact surface pattern of a series of raised land areas and corresponding depressions that impart a texture to the tissue or towel sheet or nonwoven product.

Another aspect of the disclosure is the structure has voids such as through holes to allow the passage of either or both of water or air.

Another aspect of the disclosure is that the voids are in the structure in a certain desired pattern.

A fabric structure is disclosed that is used to make textured tissue or towel, or nonwovens, the structure being permeable to air and water, comprising the sheet contact surface having a pattern including a series of raised land areas and corresponding depressions adapted to impart a texture to the tissue or towel or nonwoven, and a series of through voids adapted to allow passage of both water and air from the fabric surface into the surface, the voids being greater than 50 microns in effective diameter.

The disclosed fabric structures provide for, amongst other things, enhanced dewatering as compared to an impermeable belt. Further, the holes actually can aid texturing of the end product (tissue, towel or nonwoven) as compared to a smooth plain impermeable belt. Also, the specific pattern of lands/depressions/voids may aid sheet transfer to the Yankee cylinder and consequently, uniform creping. The fabric structure causes minimal sheet rewet compared to a woven porous structure or a conventional press fabric.

The present invention will now be described in more complete detail with reference being made to the figures identified below.

BRIEF DESCRIPTION OF THE DRAWINGS

FIG. 6D shows a void (through hole) in land areas.

FIGS. 9A-9G show fabric structures configured as a conveyor usable in tissue, towel and-nonwovens manufacturing processes.

FIGS. 10A-10C show a fabric structure with a branched void structure.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the illustrated embodiments set forth herein. Rather, these illustrated embodiments are provided so that this disclosure will be thorough and complete, and will convey the scope of the invention to those skilled in the art.

While the scope of the application discusses the use of the belt or sleeve structure in the production of both nonwovens and tissue or towel, most of the discussion will be concerning tissue/towel.

While the term fabric and fabric structure is used, fabric, belt, conveyor, and fabric structure are used interchangeably to describe the structure described herein.

Figure 1:
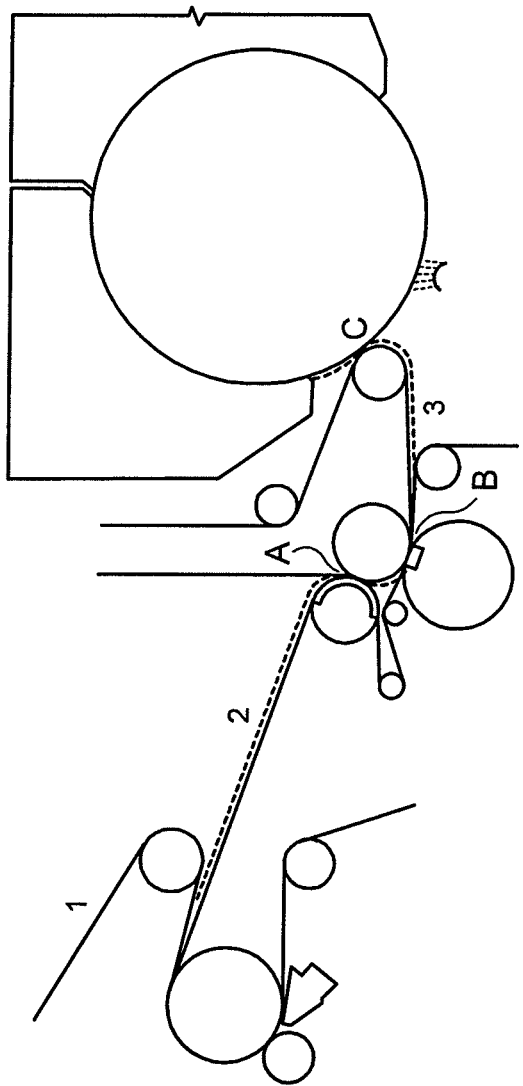
FIG. 1 is a diagram of a machine that can be used to produce tissue or towel.

FIG. 1 is a diagram of a machine that can be used to produce tissue or towel, showing three fabrics: a forming fabric 1, a press fabric 2, and a transfer fabric 3. The fabric structure disclosed can be used as any of these fabrics 1,2,3. That is to say, a fabric structure can be adapted for use in a machine that imparts texture (e.g., impressions) to a tissue or towel product.

As the tissue/towel sheet is conveyed through the machine, it passes through a number of press nips A, B, C where the sheet is dewatered and the fabric structure 1, 2, or 3, due to a topographical surface pattern thereon, imparts a predetermined texture to the tissue/towel sheet in any press nip(s) A, B, C, that the fabric structure and sheet pass through together.

A fabric structure can be used to make textured tissue, towel, or a nonwoven, the structure being permeable to air and water. The structure comprises a sheet contact surface having a pattern including a series of raised land areas and depressions adapted to impart a texture to the tissue, towel, or nonwoven. The fabric structure may include a supporting substrate, which can be constructed from any one or more of textile materials—which includes any woven or nonwoven supporting substrate (i.e., base fabric)—such as woven yarns, nonwovens, yarn arrays, spiral links, knits, braids; spiral wound strips of any of above-listed forms, independent rings, and other extruded element forms. For example, the textile material can be made from polymers such as polyethylene terephthalate ("PET"), polyamide ("PA"), polyethylene ("PE"), polypropylene ("PP"), polyphenylene sulfide ("PPS"), polyether ether ketone ("PEEK"), polyethylene naphthalate ("PEN") metal, or a combination of polymers and metal.

Figure 2:
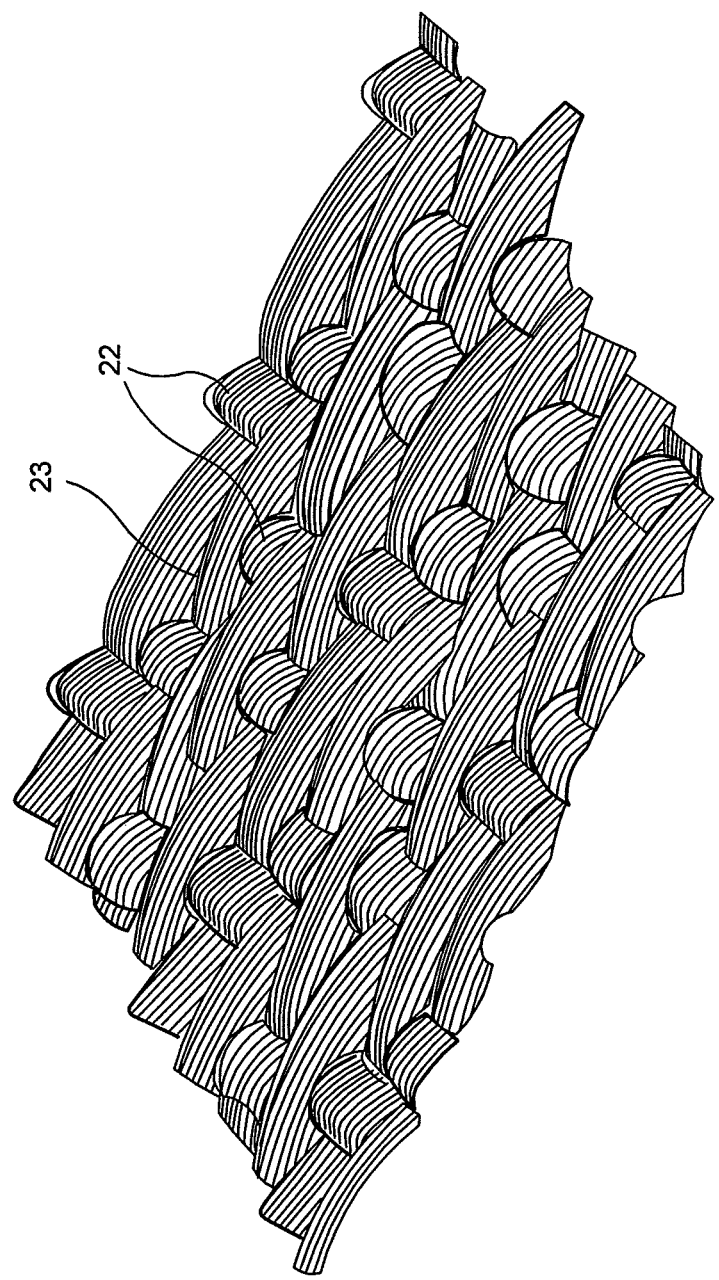
FIG. 2 is a diagram of a woven substrate showing the pattern of lands and depressions that are caused by the yarns as they are woven over and under each other.

In another example, FIG. 2 is a diagram of one embodiment of a woven substrate showing a pattern of lands 22 formed by MD yarns with depressions 23 formed therebetween with the lands resulting from the yarns as they are woven over and under each other. Such a substrate can take any number of woven forms, for example a long warp knuckle up weave or a long warp knuckle down weave. Examples of such weaves may be found in U.S. Pat. No. 6,769,535, the entirety of which is incorporated by reference hereby. The entire fabric structure or just the supporting substrate can also be adapted to include antistatic properties, as antistatic or static dissipative properties are factors in producing nonwovens via "dry" process such as melt blowing.

Figure 3:
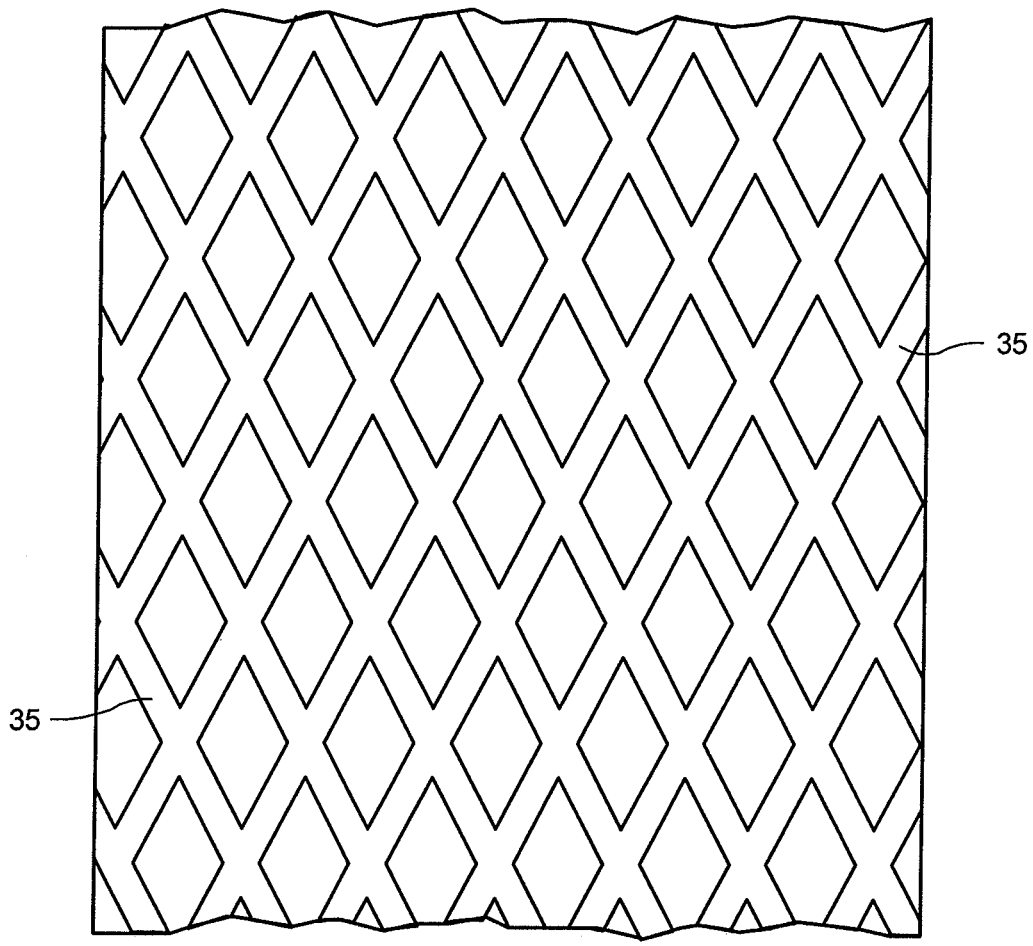
FIG. 3 is a diagram having a surface of the fabric structure wherein depressions have been graved into a film or coating of the fabric, sleeve or belt.

FIG. 3 illustrates another embodiment of a surface of the fabric structure with voids to be incorporated therein. As illustrated, the depressions are grooves 35 that have been graved into surface material such as a film or coating of a fabric, sleeve or belt. The surface material can be a coating formed from a liquid or a fused powder, a laminated film or a melted fiber, and can be formed by using, for example a liquid (aqueous or high solids), a coagulated material, a melted particulate polymer, or a foam. For example, a coating can be polyurethane, acrylic, silicone or a coating containing a fluorocarbon reinforced with polymeric or cellulosic fibers, or filled with inorganic particles of any size (e.g., nanometric particles). The particles can for example, be adapted to provide the fabric structure with improved sheet release, resistance to abrasion, or resistance to contamination.

The fabric structure is permeable to air and water, and includes a series of voids such as holes that are adapted to allow passage of water and/or air from the fabric surface into and through the structure, the voids being greater than 50 microns in effective diameter. Preferably holes are greater than 0.2 mm in effective diameter. While voids are discussed as holes, voids include any number of configurations, as discussed herein. The holes can be designed to allow water and/or air to pass through the surface and into and through the structure. The holes can be of the same size or of differing sizes. Also, the holes can be configured such that they are only in the depressions (see, for example FIG. 4). However, the fabric structure can be also designed such that holes are only in the land areas or such that the holes are in both the land areas and the depressions. In the case where the holes are in both the land areas and the depressions, the holes can be designed such that dimensions of the holes in the land areas are of different dimensions than the holes in the depressions. For example, the holes in the land areas can be larger than the holes in the depressions, or, the holes in the land areas can be smaller than the holes in the depressions. In another example, the hole dimensions can be such that the holes are smaller at the surface of the hole than the interior or the bottom of the hole. On the other hand, the hole dimensions can be larger at the surface of the hole than at the interior or bottom of the hole. The holes can also be cylindrical in shape. The fabric structure can be designed such that holes are in all of the land areas. The fabric structure can also be designed such that the holes are in all of the depression areas. Holes can be produced any number of ways, including mechanical punching or laser perforation. The fabric structure can also be designed such that the coating/film surface is flexible and compressible in the Z direction (i.e., through the thickness direction), but is also resilient.

In one embodiment, the fabric structure can include a surface pattern that comprises a compound texture. The compound texture can include a first texture formed by land areas and corresponding depressions formed in a surface material. The depressions can be formed by, for example, cutting, embossing, graving, or laser graving a surface material such as resin coating, a film, or a foam. A second texture can be formed by the textile material of the substrate and interstices of the textile material of the substrate. The textile material construction can be: woven yarns, a nonwoven, an MD yarn array, a CD yarn array, spiral links, independent rings, an extruded element, a knit, or a braid. For example, where the textile material is woven from yarns or is formed from interconnected spiral links, the second texture is formed by the yarns or spiral links and the interstices between the yarns or spiral links of the substrate. The surface material as described herein, includes a coating, a film, fused fiber, fused particles, or foam. The surface material can have sufficient pliability so that for example, if applied to a woven substrate it conforms to the shape thereof including the knuckles to create a textured surface. In the case of a film as a surface material when applied to a substrate, it may be sufficiently flexible (e.g. polyurethane film) that when heated it conforms to that of the substrate. For example, if the substrate is woven that the film would conform to the weave pattern, knuckles and all. If, however, the film was rigid (e.g. MYLAR®) it would not conform to the surface of the substrate but rather lay flat on any high points (e.g. knuckles in the case of a woven substrate) to create a planar surface which is subsequently texturized. In the fabric structure, the holes can be in the land areas only of one of the textures, or the holes can be in the land areas of both of the textures. Also, the holes can be in the depressions of only one texture or in the depressions of both of the textures. In yet another variation, the holes are can be in lands of one of the textures, and the depressions of the other texture.

Figure 4:
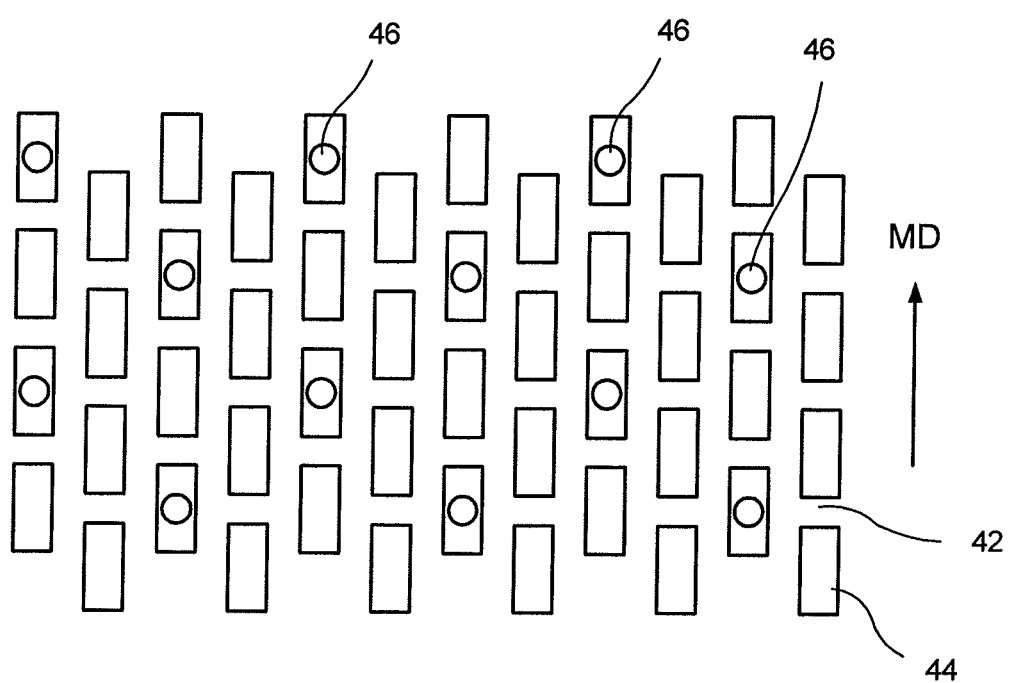
FIG. 4 is a diagram looking down on the surface of the structure, the surface of which is either a film or coating. The dark areas are graved depressions; light areas are raised land areas, and the circles represent through voids or holes.

FIG. 4 is a diagram looking down on the surface of the fabric structure, the surface of which can be either a film or coating. The dark areas are graved depressions 44 and the light areas are raised lands 42, and the circles represent voids or holes 46. In the diagram, the holes 46 are configured such that they are only in the depressions 44. As shown in the FIG. 4, a surface pattern can be uniform and repeatable. The land areas 42 of the surface pattern are continuous, although the pattern can be designed such that the land areas are discrete islands. The depressions 44 are shown as discrete depressions 44, however, the depressions can also be designed to be continuous. Depressions can be formed any number of ways, including embossing, cutting, graving, or laser graving. Note that while land areas and depressions are indicated thereon they obviously can be the reverse thereof with the land areas taking the shape of the depressions and vice versa in this and the other embodiments described herein.

The surface pattern shape of an island looking downward, be it a depression or a land area, can be any number of shapes, including round, oblong, square, rectangular, trapezoidal, pentagonal, hexagonal, diamond, frustoconical, triangular, or other polygons. The continuous land areas or depressions can be straight with respect to the machine direction ("MD"), straight with respect to the cross-machine direction ("CD"); at an angle to the MD or CD, or in two distinct sets at an angle to the MD or CD (for each set). The continuous land areas or continuous depressions can be curvilinear or straight. Moreover the continuous land areas or continuous depressions can be both curvilinear and straight on the same fabric structure and the continuous areas can have sections which are curvilinear and straight. The cross-sectional shapes of the land areas of the islands and continuous land areas may take on a multitude of shapes including polygonal or other shapes suitable for the purpose. Cross-sectional is meant to mean looking axially along the fabric. As shown in FIG. 4 the discrete depressions 44 and the continuous land areas 42 are straight with respect to the MD. While the depressions and land areas are shown rectangular in shape they may take on many shapes including that which would form a logo in the tissue, towel or nonwoven.

The surface of the structure can thus be made in any number of ways, including by directly molding it at the point of manufacture to create the structure, or at another point by, for example, later graving the sheet or web contact surface or side of the fabric structure (e.g., by laser); or by precision resin deposition as set forth in U.S. Pat. Nos. 7,005,044, 7,008,513, 7,014,735, 7,022,208, 7,144,479, 7,166,196, and 7,169,265; or by extrudate as disclosed in U.S. Pat. No. 6,358,594, the disclosures of which are all incorporated herein by reference. Where the fabric structure is used, for example, to manufacture tissue, towel or a nonwoven, the patterns contemplated are such to optimize sheet bulk and texture verses machine runability.

Figure 5:
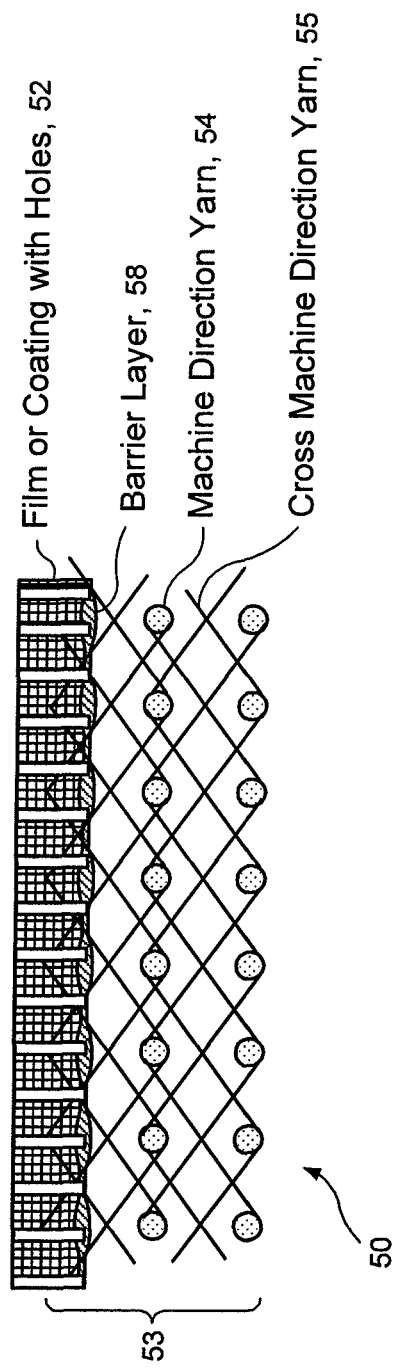
FIG. 5 is a cross section of an embodiment showing a multilayer woven substrate with a coating or a laminated film surface with a textured surface. The coating/film penetrates slightly into the woven structure which has a barrier layer. Through voids such as through holes are shown passing through the impermeable film/coating into the open weave structure allowing passage of air and/or water.

FIG. 5 is a cross section of an embodiment showing a multilayer woven substrate 53 with a surface material 52 such as a coating or a laminated film surface. The coating or film can be adapted to have sufficient rigidly to reside on the surface of knuckles included in the fabric structure. FIG. 5 shows a woven substrate 53 that includes MD yarns 54 and CD yarns 55, and does not include batt fiber needled into the base fabric. As shown in FIG. 5, the coating/film 52 penetrates slightly into the woven structure 53 which has a barrier layer 58. A surface material 52 such as a coating can also be porous or porous foam, and the fabric structure 50 can be designed not to be permeable to air or water except by the holes 56. Holes or voids 56 are shown passing through the impermeable film/coating 52 into the open weave structure 53 allowing passage of either or both of air and water.

The surface material could include a durable material with a high solids content, such as, for example, polyurethane, acrylic, silicone, or a coating containing a fluorocarbon each of which may be reinforced with polymeric or cellulosic fibers, or filled with inorganic particles of any size (e.g., nanometric particles). The particles can for example, be adapted to provide the fabric structure with improved sheet release, resistance to abrasion, or resistance to contamination. The resulting coated fabric thereby includes a solid coating on the surface. While the coating does not penetrate the supporting substrate, the composite structure is rendered impermeable. The coated fabric can then be sanded or surface enhanced to obtain a smooth surface. Holes can then be formed in the fabric structure, by, for example, laser punching to create the holes. The laser punching can be configured such that the holes only penetrate the coating, but do not penetrate the elements (e.g. yarns) of the support substrate. The surface can then be graved to give a desired texture and the resulting fabric structure is a textured coated fabric with through holes in the coating. The resulting fabric surface is thereby durable and permeable to both air and/or water.

Nonetheless, surface material can cover a support substrate of any textile material, which includes both woven and nonwoven base fabrics with a batt of fiber needled to the base structure. For example the fabric structure can include a layer of batt fiber under the coated surface of the fabric structure. The batt layer can be adapted to allow the surface material to penetrate into the batt layer and/or penetrate at least partially into the substrate.

Figure 6:
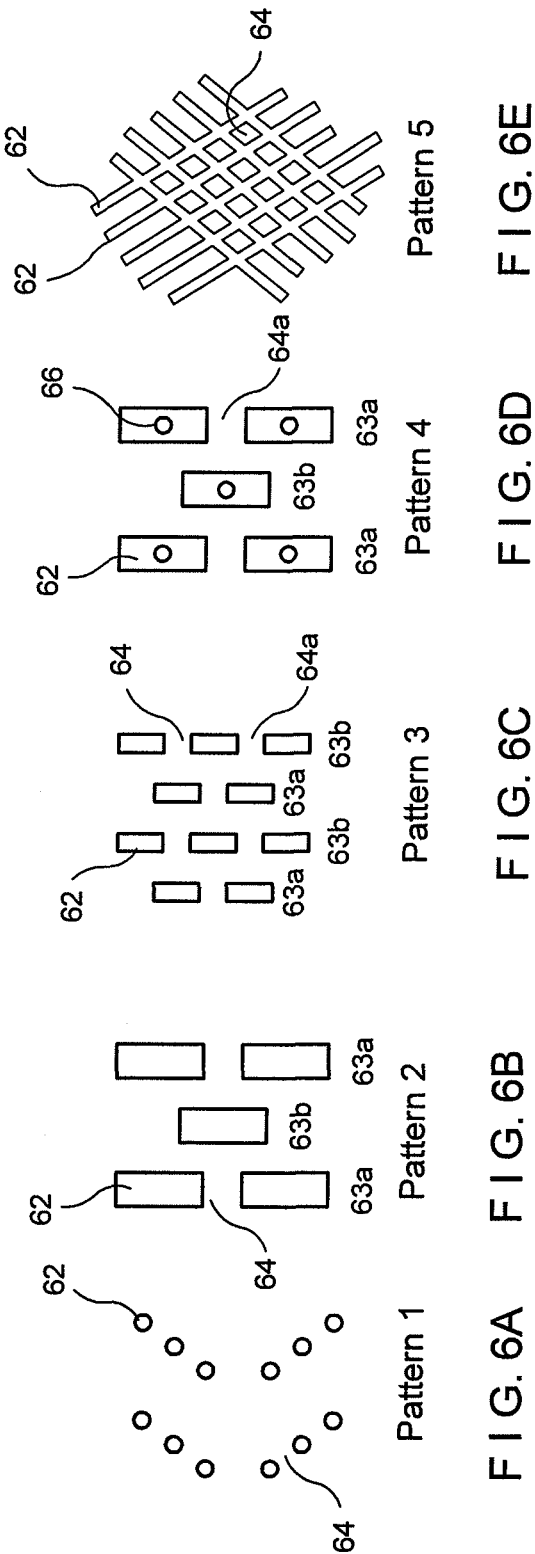
FIGS. 6A-6E are patterns of land areas and corresponding depressions formed by graving or cutting.

FIGS. 6A-6E are patterns of land areas and corresponding depressions formed by, for example, graving or cutting, where the shaded areas represent land areas 62. FIG. 6D shows a void or hole 66 in land areas. Surface patterns can be adapted to be uniform and repeatable, nonuniform and repeatable, as well as nonuniform and random. As explained above (i.e., with respect to FIG. 4) the land areas 62 of the surface pattern include discrete islands 62 or continuous areas (not shown), and the depressions 64 can include discrete islands (not shown) or continuous areas 64. The shape of the island can be round, oblong, square, rectangular, trapezoidal, pentagonal, hexagonal, diamond, frustoconical, triangular, or another polygonal shape. At FIG. 6A, the pattern has about 3 land areas 62 per cm$^2$. In FIGS. 6B and 6D, the pattern includes rectangular, discreet land areas 62 about 2.0 mm by 1.0 mm, and continuous depressions 64 that separate directional columns 63a, 63b of the discreet land areas 62 by about 1.0 mm. Alternate columns 63a of the land areas 62 are separated by depressions 64a of about 1.0 mm.

In FIG. 6C, the pattern includes rectangular, discreet land areas 62 about 0.5 mm by 1.0 mm, and continuous depressions 64a that separate directional columns 63a, 63b of the discreet land areas are about 0.5 mm. Alternate columns 63a of the land areas 62 are separated by depressions 64a of about 0.5 mm. FIG. 6E shows a pattern that includes a diagonally cross-hatched pattern of continuous land areas 62 and discreet, square or diamond shaped depressions 64, where the depressions and the land areas are each about 1 mm in width, and the discreet depressions 64 are about 1.0 mm$^2$.

Figure 7:
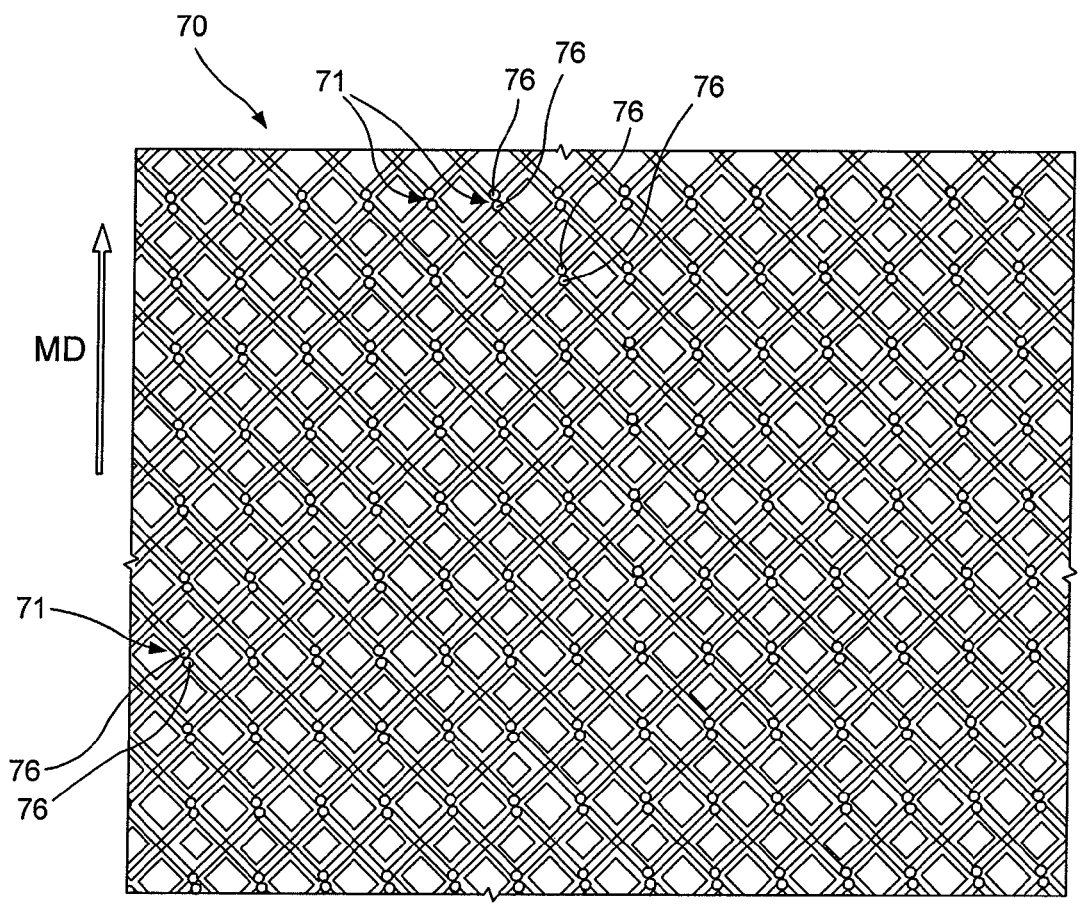
FIG. 7 is a photograph of a belt with a coating that has been graved in a criss/cross pattern. Pairs of voids are located in the recesses/depressions where they criss-cross at certain predetermined locations. In this manner, the voids are oriented along generally machine direction (MD) lines. The placement of the voids also contributes somewhat to the texture of the resultant tissue, towel or nonwoven by causing localized fiber reorientation as fluid (air or water or both) passes through the voids from the textured surface through the rest of the structure.

FIG. 7 is a photograph of a belt 70 with a coating that has been graved in a criss-cross pattern. As illustrated therein, pairs of voids 76 are located in the recesses 71 where they criss-cross at certain predetermined locations. In this manner, the voids 76 are oriented along generally MD lines. The placement of the voids 76 also contributes to the texture of the resultant tissue, towel or nonwoven by causing localized fiber reorientation as a fluid (air or water or both) passes through the void 76 from the textured surface through the rest of the structure.

Figure 8A:
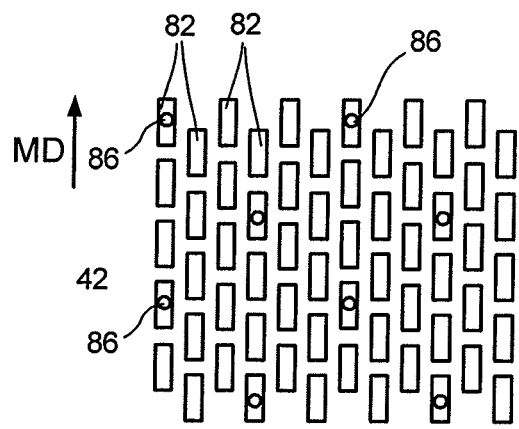
FIGS. 8 A-C show different patterns of lands and depressions with through holes in a desired pattern through some of the lands.
Figure 8B:
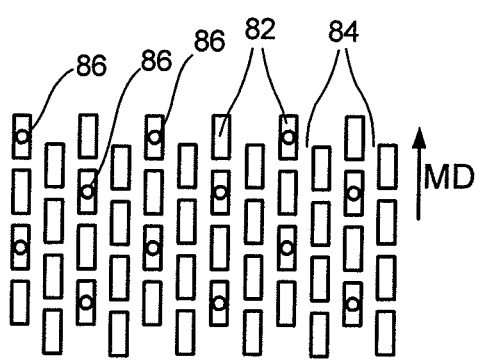
Figure 8C:
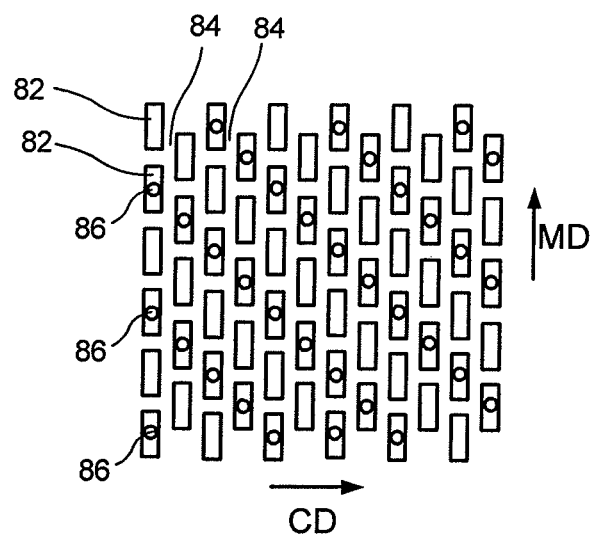

FIGS. 8 A-C show different patterns of lands 82 and depressions 84 with through holes 86 in a desired pattern through some of the lands. The continuous lands 82 or the depressions 84 can be straight with respect to the MD, straight with respect to the CD; at an angle to the MD or CD, or in two distinct sets at an angle to the MD or CD. The angles of the two sets can be the same angles or at different angles. The continuous lands 82 or the depressions 84 can be curvilinear or straight. Also the continuous lands 82 or the depressions 84 can be both curvilinear and straight; or the continuous lands 82 or the depressions 84 can have sections which are curvilinear and straight. The depressions can be formed by any one of embossing, cutting, graving, or laser graving. As shown at FIG. 8A, the pattern has about 4 holes 86 per cm$^2$ at every third pattern in the CD and the MD, whereas at FIG. 8B the pattern has about 7 holes 86 per cm$^2$ at every second pattern in the CD and every second pattern in the MD, and FIG. 8C shows about 12 holes 86 per cm$^2$. In each of FIGS. 8A-C, the voids 86 are shown as in the land areas 82, which are discreet islands and rectangular.

In yet another embodiment, the fabric structure can include a fabric substrate coated with a resin or a porous foam; and the fabric substrate is formed from a textile material construction which can be any of a woven fabric of yarns, an MD yarn array; a CD yarn array; both an MD and CD yarn array, a spiral link base; a plurality of independent rings; an other extruded formed element; a knitted base; or a braided base. The land areas and depressions can be formed from the textile material making up the substrate and the interstices of the textile material. For example, the land areas and depressions can be formed from the yarns or interconnected spiral links making up the substrate and the interstices between the yarns or spiral links. The land areas can share a geometric characteristic. For example, land areas can be shaped substantially the same or different. Land areas can also be about the same height or different. The land areas can also differ in a geometric characteristic. This equally applies to the other embodiments set forth herein. Also, the holes can be configured such that they are only in the land areas and extend through the underlying textile material forming the land areas. The holes can also be designed such that they are only in the depressions (i.e., the interstices) between the land areas formed by the textile material. The holes can also be in both the land areas and depressions between the yarns or elements of the textile material.

As shown in FIGS. 9A-G, in yet another embodiment, the fabric structure can be used in a tissue, towel, or nonwoven manufacturing process. However, this embodiment has been found to be especially beneficial when used in the spunlacing nonwoven process. In such an embodiment the fabric structure can be adapted to form an air-permeable conveyor for use in the aforesaid application. The conveyor can be made from an extruded or laminated film 91 in which defined holes 96 are made in order to reach the desired air permeability. These holes 96 can have different diameters from about 0.2 mm up to about 5.0 mm, and the holes 96 can be constructed to be at different angles with respect to the plane of the conveyor surface. The shape of the holes 96 can be round, square, oval or any given shape, such as a star shape.

As shown in FIG. 9A the position of the holes 96 on the surface of the conveyor can be uniformly or randomly distributed. The holes 96 can also be distributed such that that have a specific density in a given area of the conveyor or distributed uniformly over the entire surface, depending on, for example, the requirements of the nonwoven being produced. The voids 96 can also take the form of lines, which are cut or graved into the conveyor to, for example, create logos. The conveyor can be produced with a layer or a plurality of layers of polymer films 91a, 91b, with or without fiber reinforcement (woven or not). The fabric structure can also be made as a sandwich component with woven or nonwoven layer laminated between a plurality of polymer films as can be the case with any of the substrates already described herein. This reinforcement can increase the mechanical stability of the fabric structure.

The surface of the conveyor can be graved in order to create topography such as a honeycomb or other pattern, or can be further treated for a specific application such as static dissipation, or anti-contamination. The surface of the conveyor can also be grooved to create topography for different patterning applications. The fabric structure can also be made as a sleeve to be installed on a drum (a shrinkable sleeve) or as an endless or seamable fabric structure.

As shown at FIG. 9F the use of this type of conveyor allows for a better reflection of energy when used on a water jet process (hydroentangling) as compared to a standard woven belt. The structure results in, for example, improved entangling of fibers as well as preventing the penetration of fibers that are caught in the interstices or yarn crossovers of the woven structure. The result of this better fiber entanglement and reduced fiber picking is, for example, better nonwoven product release or transfer from this conveyor belt to the next position in the process.

As shown in FIG. 9G, the machine side of the fabric structure can also be made with a surface topography, grooves, or added monofilament 93 in order to create higher drainage in the case of a wet process; or to create an aerodynamic effect in the case of a dry process.

The substrate itself, if present, can also have antistatic or static dissipative properties as well.

In another embodiment disclosed is a fabric structure that may or may not have a base support substrate and comprises a sheet contact surface having a series of land areas and depressions and a branched void structure adapted to impart texture to a tissue, towel, or nonwoven. The land areas and depressions can be formed in accord with the methods and structures disclosed throughout herein. FIGS. 10A-10C show the surface and cross-section of the surface of a fabric structure 10 with a branched void or opening which comprises a plurality of small holes 10a, 10b, 10c, 10d on the sheet side 12 inclined such that they merge into a larger void 10e at an opposing side 14 of the surface. It is contemplated that, for example, in a forming section of a papermaking machine, such a permeable textured structure could replace a woven structure. Such a structure also allows for a high number of small holes in a fabric structure while also allowing for low long term elongation in the machine direction MD while allowing for high bending stiffness in the cross machine direction CD. Such a structure can also be adapted such that, for example, it allows for holes in the fabric structure that are smaller in diameter than the substrate thickness without resulting in, for example, plugged holes due to contamination.

A fabric structure with the as described branched structure surface is also contemplated for a TAD or other tissue or towel or nonwovens application. For example, a coarse structure on a paper side surface and smaller holes on an opposing machine side surface could, for instance, capture, shape, and/or orient fibers disposed on the fabric structure in a desired pattern and create a high bulk tissue, towel, or nonwoven.

The voids can be straight (cylindrical) or conical. For instance, conical holes of different patterns could be designed such that they are larger and well distributed over one side such as a web or sheet side surface, whereas the voids on the opposing machine side surface could be substantially aligned along the MD, thereby providing, for example, increased drainage.

This branched void can be formed in a structure as shown or in a laminated substrate. The voids can be created by any number of perforation methods or combination thereof, including laser drilling, mechanical punching, and embossing (e.g. thermal or ultrasonic). For example, the voids could be created by combining laser drilling with embossing. As shown in FIG. 10C, four first side voids 10a,10b,10c, 10d merge into one second side void 10e, however, any number and combination of branched voids is contemplated for either side of the fabric structure.

Figure 11:
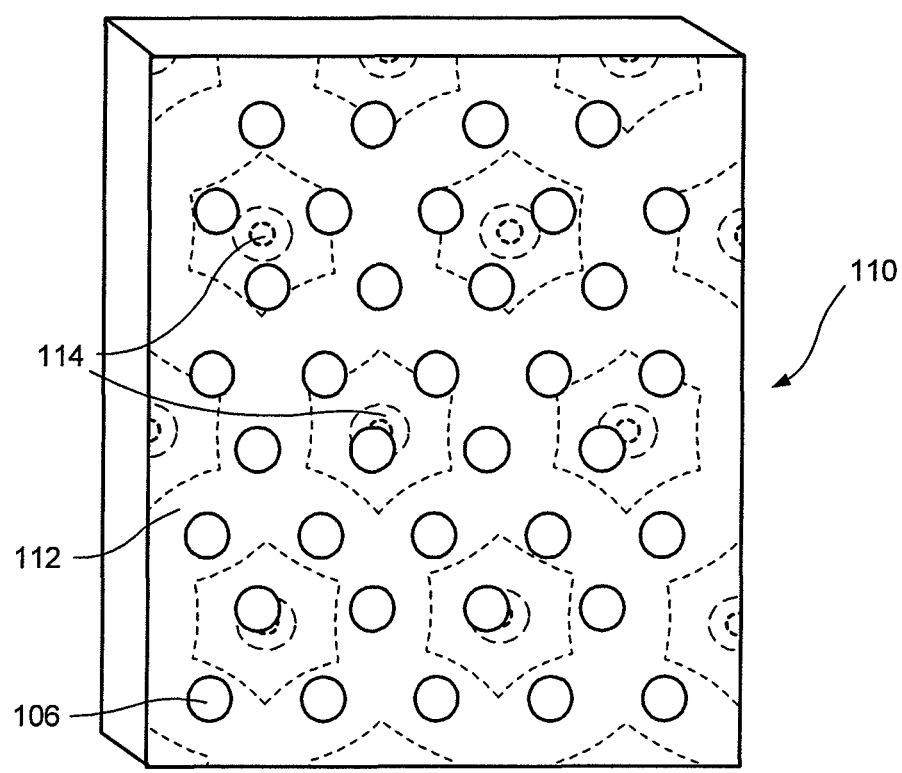
FIG. 11 shows a top or paper side view of fabric structure comprising a permeable polymeric film that includes a defined pocket pattern of a predetermined depth and shape.

In another embodiment, disclosed is a fabric structure comprising a sheet contact surface having a pattern including land areas and depressions adapted to impart texture to a tissue, towel, or nonwoven. FIG. 11 shows a top or sheet side view of fabric structure's surface 110 comprising a permeable polymeric film or coating that includes a defined pocket pattern of a predetermined depth and shape. The pocket pattern can be laser etched, scored, graved, or embossed into the surface. The fabric structure has continuous land areas 112 and discrete depressions 114, whereby increasing depth is shown by darker shading. The land areas 112 form a hexagonal matrix or lattice in a higher plane than the darker shaded depressions 114. Depressions 114 can be formed into the surface of the fabric structure such that it takes a predetermined shape, shown as hexagon 114. The depth of the pockets 114 increases as the shading darkens. Voids 106 are distributed over the surface, rendering the fabric structure permeable.

Texturing the surface along with laser drilling holes creates a surface that has a pocket volume of various shapes. The pockets could thereby, for example, when used in the forming section or TAD section of a TAD paper machine, provide a surface such that when forming or transferring a fibrous mat (tissue or towel sheet) on the surface, the mat would take the form of a mirror image of the patterned fabric structure, thereby generating bulk in the resultant paper (e.g. tissue or towel) formed from the fibrous mat.

The pockets 114 can form any predetermined pattern. The pockets 114 can also take any shape, such as, for example, diamond shapes, random shapes, butterflies, cat paws, other animals, logos, etc. Depressions 114 can be of any predetermined depth as well. The pockets 114 can provide an area for the fibrous mat to conform, thus generating an additional Z directional thickness (bulk) in the tissue/towel or nonwoven produced on the fabric structure 110, as well as a distinctive pattern. Bear in mind as aforementioned normally papermaking belts do not impart structure to the paper made thereon. "Structure" pertains to variations in the basis weight and/or the density of the paper which are greater than occur in ordinary papermaking and due to ordinary variations, such as those induced by creping. "Structure" may also, however, refer to a texture or a pattern in the tissue or towel sheet. Such "structured" tissue/towel sheets are usually soft and bulky with high absorbency. Such papermaking belts may be TAD belts or conventional press fabrics, transfer fabrics, or forming fabrics. Such belts comprise a surface patterning framework and may have a reinforcing structure. Structured tissue and towel can be softer, more absorbent, and be of a lower basis weight than unstructured tissue/towel.

Note as to all of the aforementioned embodiments, while it contemplated that texturing would be throughout the fabric surface, depending upon the application, texturing may occur over only a portion or portions of the fabric surface.

Modifications to the above would be obvious to those of ordinary skill in the art, but would not bring the invention so modified beyond the scope of the appended claims.

The invention claimed is:

1. A fabric structure used to make textured tissue or towel, or nonwovens, the structure being permeable to air and/or water, comprising:
   a sheet contact surface having a surface pattern including a series of raised land areas and depressions adapted to impart a texture to the tissue or towel or nonwoven, and
   a series of voids adapted to allow passage of water and/or air from the fabric surface into and/or through the structure, the voids being greater than 50 microns in effective diameter; and
   a supporting substrate supporting the sheet contact surface constructed from a textile material,
   wherein the sheet contact surface includes a surface material having a coating or a laminated film surface,
   wherein the surface pattern comprises a compound texture including:
   a first texture formed in the coating or film having raised land areas and depressions, and
   a second texture different from the first texture formed by the textile material of the substrate, wherein the surface material is sufficiently pliable such that it conforms to the shape of the textile material.

2. The fabric structure of claim 1, wherein the voids are only in the land areas.

3. The fabric structure of claim 1, wherein the voids are only in the depressions.

4. The fabric structure of claim 1, wherein the voids are in both the land areas and the depressions.

5. The fabric structure of claim 1, wherein the voids in the land areas are different dimensions then the voids in the depressions.

6. The fabric structure of claim 1, wherein the voids in the land areas are larger than the voids in the depressions.

7. The fabric structure of claim 1, wherein the voids in the land areas are smaller than the voids in the depressions.

8. The fabric structure of claim 1, wherein the voids are the same size.

9. The fabric structure of claim 1, wherein the void dimensions are smaller at a surface of the void than an interior or a bottom of the void.

10. The fabric structure of claim 1, wherein the dimensions are larger at a surface of void than an interior or a bottom of the void.

11. The fabric structure of claim 1, wherein the voids are cylindrical in shape.

12. The fabric structure of claim 1, wherein the voids are produced in some manner, including mechanical punching, or laser perforation.

13. The fabric structure of claim 1, wherein the surface is flexible and compressible in the Z direction, and is adapted to be resilient.

14. The fabric structure of claim 1, wherein the surface comprises a surface material, the material being selected from the group of: a coating, a laminated film, a melt fiber or foam.

15. The fabric structure of claim 1, wherein the supporting substrate is constructed from a textile material selected from the group consisting essentially of woven yarns, a nonwoven, a yarn array, a spiral link, a knit, a braid; a spiral wound strip, a series of independent rings, and an extruded element forms, or any combination of one or more of the listed forms.

16. The fabric structure of claim 15, wherein the composition of the textile material is selected from the group of a polymer and a metal; and
   where the polymer is selected from the group consisting essentially of PET, PA, PE, PP, PPS, PEEK and PEN.

17. The fabric structure of claim 14, wherein the coating is selected from the group consisting essentially of: acrylic, silicone, a coating containing a fluorocarbon, polyurethane, each of which may be reinforced with polymeric or cellulosic fibers, or filled with inorganic particles, wherein the particles are adapted to provide the structure with improved sheet release, resistance to abrasion, or resistance to contamination.

18. The fabric structure of claim 17 wherein the coating is adapted to be porous or is a porous foam, and the fabric structure is not permeable to air or water except by the voids.

19. The fabric structure of claim 15 which further includes a surface material selected from the group of: a coating, a laminated film, a melt fiber or foam and is adapted to have sufficient pliability to conform to the substrate of the fabric structure.

20. The fabric structure of claim 14 wherein the fabric structure further comprises: a layer of batt fiber under the surface of the fabric structure, wherein the batt layer is adapted to allow the surface material to penetrate into batt layer and/or penetrates at least partially into the substrate.

21. The fabric structure of claim 14 wherein the fabric structure further comprises:
   a barrier layer adapted to control a depth of surface material penetration.

22. The fabric structure of claim 14 wherein the surface material is a coating and includes a formation material selected the group consisting essentially of: a liquid (aqueous or high solids), a coagulated material, a melted particulate polymer, or a foam.

23. The fabric structure of claim 1 wherein the surface patterns are adapted to be uniform and repeatable.

24. The fabric structure of claim 1 wherein the surface patterns are adapted to be nonuniform and repeatable.

25. The fabric structure of claim 1 wherein the surface patterns are adapted to be nonuniform and random.

26. The fabric structure of claim 1 wherein the land areas of the surface pattern include discrete islands or continuous areas.

27. The fabric structure of claim 1 wherein the surface pattern includes discrete depressions or continuous areas.

28. The fabric structure of claim 26 wherein a shape of the island or discrete depressions is selected from the group consisting essentially of: round, oblong, square, rectangular, trapezoidal, pentagonal hexagonal, diamond, frustoconical, triangular, and polygonal.

29. The fabric structure of claim 26 wherein a cross-sectional shape of the islands or continuous areas are a polygonal shape.

30. The fabric structure of claim 26 wherein the continuous lands or the depressions can be straight with respect the machine direction ("MD"), straight with respect to the cross-machine direction ("CD"); at an angle to the MD or CD, or in two distinct sets at an angle to the MD or CD.

31. The fabric structure of claim 30 wherein the angles of the two sets are the same or different.

32. The fabric structure of claim 26 wherein the continuous lands or depressions are curvilinear or straight.

33. The fabric structure of claim 26 wherein the continuous lands or the depressions are both curvilinear and straight; or the continuous lands or the depressions have sections which are curvilinear and straight.

34. The fabric structure of claim 1 wherein the depressions are formed by a method selected from the group of methods consisting essentially of embossing, cutting, graving, and laser graving.

35. The fabric structure of claim 1 wherein a support substrate is coated with a resin or a porous foam or has a film attached thereto; and
   the fabric substrate is formed from a textile material construction selected from the group consisting essentially of:
   a woven fabric,
   an MD yarn array;
   a CD yarn array;
   a spiral link base;
   a plurality of independent rings;
   an extruded element;
   a knitted base; and
   a braided base,
   wherein the land areas and depressions are formed from the textile material making up the substrate.

36. The fabric structure of claim 35 wherein the voids are only in the land areas and extend through the underlying textile material forming the land area.

37. The fabric structure of claim 35 wherein the voids are only in the depressions between the land areas formed by the textile material.

38. The fabric structure of claim 35 wherein the voids are in both the land areas and depressions between the textile material.

39. The fabric structure as in claim 1 wherein the textile material is selected from the group consisting essentially of: a woven yarns, a nonwoven, an MD yarn array, a CD yarn array, spiral links, independent rings, an extruded element, a knit, or a braid.

40. The fabric structure of claim 1 wherein the voids are in the land areas of only one of the textures.

41. The fabric structure as taught in claim 1 wherein the voids are in the land areas of both of the textures.

42. The fabric structure as taught of claim 1 wherein the voids are in the depressions of only one texture.

43. The fabric structure of claim 1 wherein the voids are in the depressions of both of the textures.

44. The fabric structure of claim 38 wherein the voids are in lands of the one of the textures, and the depressions of the other texture.

45. The fabric structure of claim 1 wherein the land areas share a geometric characteristic.

46. The fabric structure of claim 44 wherein the land areas are shaped substantially the same or different.

47. The fabric structure of claim 44 wherein the land areas are the same or different heights.

48. The fabric structure of claim 1 wherein the land areas differ in a geometric characteristic.

49. The fabric structure of claim 1 wherein the fabric structure is adapted to include antistatic properties.

50. The fabric structure of claim 1 wherein the fabric structure is selected from the group of fabrics used in a machine to impart texture to a nonwoven.

51. The fabric structure of claim 1 wherein the fabric structure comprises a woven substrate having a long warp knuckle up weave.

52. The fabric structure of claim 1 wherein the fabric structure comprises a woven substrate having a long warp knuckle down weave.

53. The fabric structure of claim 1 wherein the voids are in all of the land areas.

54. The fabric structure of claim 1 wherein the voids are in all of the depression areas.

55. The fabric structure of claim 1 wherein the land areas are continuous and form a lattice pattern.

56. The fabric structure of claim 55 wherein the depressions are adapted to be at a predetermined depth and shape.

57. The fabric structure of claim 1 wherein a plurality of voids on a surface of said fabric structure merge into a void on an opposing surface of said fabric structure.

58. The fabric structure of claim 57 wherein a diameter of the voids is smaller than the thickness of the substrate.

59. The fabric structure of claim 1 wherein the land areas are continuous and form a lattice pattern.

60. The fabric structure of claim 59 wherein the depressions are adapted to be at a predetermined depth and shape.

61. The fabric structure of claim 57 wherein a plurality of voids on a surface of said fabric structure merge into a void on an opposing surface of said fabric structure.

62. The fabric structure of claim 27 wherein a shape of the island or discrete depressions is selected from the group consisting essentially of: round, oblong, square, rectangular, trapezoidal, pentagonal hexagonal, diamond, frustoconical, triangular, and polygonal.

63. The fabric structure of claim 27 wherein the continuous lands or the depressions can be straight with respect the machine direction ("MD"), straight with respect to the cross-machine direction ("CD"); at an angle to the MD or CD, or in two distinct sets at an angle to the MD or CD.

64. The fabric structure of claim 27 wherein the continuous lands or depressions are curvilinear or straight.

65. The fabric structure of claim 27 wherein the continuous lands or the depressions are both curvilinear and straight; or the continuous lands or the depressions have sections which are curvilinear and straight.

* * * * *